United States Patent
Hutchins

(10) Patent No.: US 8,416,242 B1
(45) Date of Patent: Apr. 9, 2013

(54) METHOD AND SYSTEM FOR INTERPOLATING LEVEL-OF-DETAIL IN GRAPHICS PROCESSORS

(75) Inventor: Edward A. Hutchins, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 1635 days.

(21) Appl. No.: 10/846,786

(22) Filed: May 14, 2004

(51) Int. Cl.
*G06T 17/00* (2006.01)

(52) U.S. Cl. ........ 345/428; 345/581; 345/582; 345/606; 345/619; 345/643

(58) Field of Classification Search .................. 345/606, 345/582, 619
See application file for complete search history.

(56) References Cited

U.S. PATENT DOCUMENTS

| | | |
|---|---|---|
| 4,208,810 A | 6/1980 | Rohner et al. |
| 4,667,308 A | 5/1987 | Hayes et al. |
| 5,170,152 A | 12/1992 | Taylor |
| 5,268,995 A | 12/1993 | Diefendorff et al. |
| 5,270,687 A | 12/1993 | Killebrew, Jr. |
| 5,285,323 A | 2/1994 | Hetherington et al. |
| 5,313,567 A | 5/1994 | Civanlar et al. |
| 5,384,912 A | 1/1995 | Ogrinc et al. |
| 5,424,755 A | 6/1995 | Lucas et al. |
| 5,461,423 A | 10/1995 | Tsukagoshi |
| 5,487,022 A | 1/1996 | Simpson et al. |
| 5,544,292 A | 8/1996 | Winser |
| 5,557,298 A | 9/1996 | Yang et al. |
| 5,579,473 A | 11/1996 | Schlapp et al. |
| 5,594,854 A | 1/1997 | Baldwin et al. |
| 5,604,824 A | 2/1997 | Chui et al. |
| 5,613,050 A | 3/1997 | Hochmuth et al. |
| 5,710,577 A | 1/1998 | Laumeyer |
| 5,748,202 A | 5/1998 | Nakatsuka et al. |
| 5,764,228 A | 6/1998 | Baldwin |
| 5,777,628 A | 7/1998 | Buck-Gengler |
| 5,801,711 A | 9/1998 | Koss et al. |
| 5,808,617 A | 9/1998 | Kenworthy et al. |
| 5,818,456 A | 10/1998 | Cosman et al. |
| 5,831,623 A | 11/1998 | Negishi et al. |
| 5,844,569 A | 12/1998 | Eisler et al. |
| 5,856,829 A | 1/1999 | Gray, III et al. |
| 5,943,058 A | 8/1999 | Nagy |

(Continued)

FOREIGN PATENT DOCUMENTS

CN 101819676 9/2010

OTHER PUBLICATIONS

Euh, J., Chittamuru, J., Burleson, W., Cordic Vector Interpolator for Power-Aware 3D Computer Graphics, Oct. 2002, IEEE Workshop on Signal Processing Systems, pp. 240-245.
http://www.encyclopedia.com/html/s1/sideband.asp; Nov. 2010.

(Continued)

*Primary Examiner* — Xiao M. Wu
*Assistant Examiner* — Phi Hoang

(57) ABSTRACT

A method determining LOD values for a geometric primitive, in accordance with one embodiment of the present invention, includes accessing a plurality of geometric parameters of a vertex. An LOD value for a vertex is calculated as a function of the plurality of parameters of the vertex in a setup module. In a raster module an LOD value for a pixel is interpolated as a function of the LOD value of the pixel corresponding to the vertex and a view distance of the non-vertex pixel.

19 Claims, 7 Drawing Sheets

U.S. PATENT DOCUMENTS

| | | | |
|---|---|---|---|
| 5,963,210 | A | 10/1999 | Lewis et al. |
| 5,977,977 | A | 11/1999 | Kajiya et al. |
| 5,995,121 | A | 11/1999 | Alcorn et al. |
| 6,002,410 | A | 12/1999 | Battle |
| 6,009,435 | A * | 12/1999 | Taubin et al. ............... 345/555 |
| 6,028,608 | A * | 2/2000 | Jenkins ........................ 345/619 |
| 6,031,548 | A * | 2/2000 | Gueziec et al. ............... 345/440 |
| 6,052,113 | A | 4/2000 | Foster |
| 6,072,500 | A | 6/2000 | Foran et al. |
| 6,118,452 | A | 9/2000 | Gannett |
| 6,130,673 | A * | 10/2000 | Pulli et al. .................... 345/428 |
| 6,160,557 | A | 12/2000 | Narayanaswami |
| 6,166,743 | A | 12/2000 | Tanaka |
| 6,191,794 | B1 | 2/2001 | Priem et al. |
| 6,198,488 | B1 | 3/2001 | Lindholm et al. |
| 6,208,198 | B1 | 3/2001 | Lee |
| 6,222,550 | B1 | 4/2001 | Rosman et al. |
| 6,229,553 | B1 | 5/2001 | Duluk, Jr. et al. |
| 6,239,808 | B1 | 5/2001 | Kirk et al. |
| 6,239,812 | B1 | 5/2001 | Pettazzi et al. |
| 6,259,461 | B1 | 7/2001 | Brown |
| 6,288,730 | B1 | 9/2001 | Duluk, Jr. et al. |
| 6,304,268 | B1 * | 10/2001 | Iourcha et al. ................ 345/428 |
| 6,313,846 | B1 | 11/2001 | Fenney et al. |
| 6,337,744 | B1 | 1/2002 | Kuroda |
| 6,373,495 | B1 * | 4/2002 | Lin et al. ....................... 345/582 |
| 6,400,372 | B1 * | 6/2002 | Gossweiler et al. .......... 345/619 |
| 6,421,053 | B1 | 7/2002 | Johns et al. |
| 6,453,330 | B1 | 9/2002 | Battle et al. |
| 6,456,291 | B1 | 9/2002 | Fowler |
| 6,512,524 | B1 | 1/2003 | Mang |
| 6,516,032 | B1 | 2/2003 | Heirich et al. |
| 6,518,974 | B2 * | 2/2003 | Taylor et al. .................. 345/606 |
| 6,525,729 | B1 | 2/2003 | Akerman et al. |
| 6,525,737 | B1 | 2/2003 | Duluk, Jr. et al. |
| 6,542,971 | B1 | 4/2003 | Reed |
| 6,597,363 | B1 | 7/2003 | Duluk, Jr. et al. |
| 6,618,048 | B1 | 9/2003 | Leather |
| 6,618,049 | B1 * | 9/2003 | Hansen ......................... 345/423 |
| 6,621,509 | B1 | 9/2003 | Eiref et al. |
| 6,636,214 | B1 | 10/2003 | Leather et al. |
| 6,636,223 | B1 | 10/2003 | Morein |
| 6,664,958 | B1 | 12/2003 | Leather et al. |
| 6,664,960 | B2 | 12/2003 | Goel et al. |
| 6,670,955 | B1 | 12/2003 | Morein |
| 6,693,643 | B1 | 2/2004 | Trivedi et al. |
| 6,711,603 | B1 | 3/2004 | Takenaka |
| 6,717,576 | B1 | 4/2004 | Duluk, Jr. et al. |
| 6,717,577 | B1 | 4/2004 | Cheng et al. |
| 6,731,288 | B2 | 5/2004 | Parsons et al. |
| 6,745,336 | B1 | 6/2004 | Martonosi et al. |
| 6,745,390 | B1 | 6/2004 | Reynolds et al. |
| 6,774,895 | B1 | 8/2004 | Papakipos et al. |
| 6,791,569 | B1 | 9/2004 | Millet et al. |
| 6,807,620 | B1 | 10/2004 | Suzuoki et al. |
| 6,819,331 | B2 | 11/2004 | Shih et al. |
| 6,879,324 | B1 * | 4/2005 | Hoppe .......................... 345/423 |
| 6,879,328 | B2 | 4/2005 | Deering |
| 6,891,548 | B2 * | 5/2005 | Alcorn et al. ................. 345/606 |
| 6,912,695 | B2 | 6/2005 | Ernst et al. |
| 6,919,895 | B1 | 7/2005 | Solanki et al. |
| 6,968,296 | B2 | 11/2005 | Royle |
| 6,982,722 | B1 | 1/2006 | Alben et al. |
| 6,987,517 | B1 | 1/2006 | Donovan et al. |
| 6,999,100 | B1 | 2/2006 | Leather et al. |
| 7,034,828 | B1 | 4/2006 | Drebin et al. |
| 7,042,462 | B2 | 5/2006 | Kim et al. |
| 7,079,156 | B1 | 7/2006 | Hutchins et al. |
| 7,098,924 | B2 | 8/2006 | Prokopenko et al. |
| 7,102,639 | B2 * | 9/2006 | Oka ............................... 345/428 |
| 7,106,336 | B1 | 9/2006 | Hutchins |
| 7,117,238 | B1 | 10/2006 | Foskett et al. |
| 7,145,566 | B2 | 12/2006 | Karlov |
| 7,190,366 | B2 | 3/2007 | Hutchins et al. |
| 7,224,359 | B1 | 5/2007 | Papakipos et al. |
| 7,257,814 | B1 | 8/2007 | Melvin et al. |
| 7,292,242 | B1 | 11/2007 | Wittenbrink et al. |
| 7,295,204 | B2 * | 11/2007 | Sfarti ............................ 345/423 |
| 7,538,773 | B1 | 5/2009 | Hutchins |
| 7,595,806 | B1 | 9/2009 | Toksvig et al. |
| 2002/0089512 | A1 * | 7/2002 | Slade et al. ................... 345/582 |
| 2002/0089701 | A1 | 7/2002 | Lu et al. |
| 2002/0158865 | A1 | 10/2002 | Dye et al. |
| 2002/0163967 | A1 | 11/2002 | Youn et al. |
| 2003/0016217 | A1 | 1/2003 | Vlachos et al. |
| 2003/0063087 | A1 | 4/2003 | Doyle et al. |
| 2003/0201994 | A1 | 10/2003 | Taylor et al. |
| 2004/0012597 | A1 | 1/2004 | Zatz et al. |
| 2004/0012598 | A1 | 1/2004 | Zatz |
| 2004/0012600 | A1 | 1/2004 | Deering et al. |
| 2004/0078504 | A1 | 4/2004 | Law et al. |
| 2004/0119710 | A1 | 6/2004 | Piazza et al. |
| 2004/0125103 | A1 | 7/2004 | Kaufman et al. |
| 2004/0145589 | A1 | 7/2004 | Prokopenko et al. |
| 2004/0227755 | A1 * | 11/2004 | Sfarti ............................ 345/423 |
| 2004/0246260 | A1 | 12/2004 | Kim et al. |
| 2004/0257376 | A1 * | 12/2004 | Liao et al. .................... 345/587 |
| 2005/0066205 | A1 | 3/2005 | Holmer |
| 2005/0088450 | A1 * | 4/2005 | Chalfin et al. ................ 345/552 |
| 2005/0124583 | A1 | 6/2005 | Becker et al. |
| 2005/0162436 | A1 | 7/2005 | Van Hook et al. |
| 2005/0195187 | A1 | 9/2005 | Seiler et al. |
| 2005/0231506 | A1 | 10/2005 | Simpson et al. |
| 2005/0231519 | A1 | 10/2005 | Solanki et al. |
| 2005/0237337 | A1 | 10/2005 | Leather et al. |
| 2006/0197768 | A1 | 9/2006 | Van Hook et al. |
| 2009/0096784 | A1 | 4/2009 | Wardetzky et al. |
| 2009/0167763 | A1 | 7/2009 | Waechter et al. |
| 2010/0189342 | A1 | 7/2010 | Parr et al. |

OTHER PUBLICATIONS

Pixar, Inc.; PhotoRealistic RenderMan 3.9 Shading Language Extensions; Sep. 1999.

Narayanaswami, Efficient Gouraud Shading and Linerar Interpolation over Triangles, Computer Graphics Forum, vol. 14, No. 1, pp. 17-24, 1995.

\* cited by examiner

METHOD AND SYSTEM FOR INTERPOLATING LEVEL-OF-DETAIL IN GRAPHICS PROCESSORS

CROSS-REFERENCE TO RELATED APPLICATIONS

The present application is related to U.S. patent application Ser. No. 10/846,787, filed May 14, 2004, by Edward Hutchins, entitled "Method and System for Deferred Evaluation of Transforms in Graphics Processors, which is incorporated herein by reference."

BACKGROUND OF THE INVENTION

Three-dimensional graphics processing is utilized in a number of applications, from electronic games, and movies to computer aided design (CAD). Conventionally, three-dimensional graphics processing includes a multi-step rendering process of transitioning from a database representation of three-dimensional objects to a pseudo realistic two-dimensional projection of the object into a display space. The process generally includes setting up a polygon model (e.g., a plurality of primitives) of objects, applying linear transformation to each primitive, culling back facing primitives, clipping the primitives against a view volume, rasterizing the primitives to a pixel coordinate set, shading/lighting the individual pixels using interpolated or incremental shading techniques, and the like. Typically, graphics processors are organized in a "deep" pipeline architecture, where each stage is dedicated to performing specific functions. A benefit of a deep pipeline architecture is that it permits fast, high quality rendering of even complex scenes.

The stages of a conventional graphics processor architecture are optimized for high-speed rendering operations (e.g., interpolating parameters, such as color, texture and depth over each two dimensional projection of a primitive). The architecture of the deep pipeline is configured in order to maximize the overall rendering throughput of the graphics processor. Generally, deep pipeline architectures have sufficient data throughput (e.g., pixel fill rate) to implement fast, high quality rendering on large display space devices of even complex scenes. For example, such conventional deep pipelines are configured to compute the various parameters required to render the pixels using multiple, high precision functions. The functions are implemented such that they generate high precision results even in those circumstances where such precision is redundant or unnecessary.

The dedicated stages of deep pipeline architectured graphics processors require a relatively high transistor count. Accordingly, conventional graphic processors require a significant chip area, resulting in relatively high costs. In addition, to achieve fast, high quality rendering in deep pipeline architectures, various stages experience periods of idle processing cycles. Many of the stages consume about the same amount of power regardless of whether they are processing pixels or idle. Accordingly, conventional graphics processors consume significant power, even if the stages are performing comparatively little processing.

As a result of cost and power consumption considerations, conventional graphics processors are unsuitable for many mobile and wireless applications (e.g., wireless phones, personal digital assistants and the like). Therefore, what is desired is a graphics processor architecture having relatively low power consumption and costs.

SUMMARY OF THE INVENTION

Embodiments of the present invention are directed toward determining pixel parameters for use in three-dimensional graphics processing. In one embodiment, a method of determining pixel parameters includes accessing a geometric primitive having a plurality of vertices. Each vertex of the geometric primitive has a plurality of parameters, such as an X coordinate, a Y coordinate and a respective view distance (W) value associated therewith. The LOD interpolant value for a vertex may be computed as a function of the other vertex parameters divided by $1/W^2$ for the vertex. During rasterization of the geometric primitive, final LOD values for pixels in the geometric primitive are interpolated. The interpolated final LOD values for the pixels are determined according to the formula: $final\_LOD(i)=Log_2(LOD\_interp*Wi^2)$, where $final\_LOD(i)$ is interpolated for a respective pixel, i. The method may further include propagating the pixels and the respective final LOD values to modules of a graphics pipeline for rendering thereof.

In another embodiment, a method of determining LOD values for a geometric primitive includes accessing a plurality of geometric parameters of a vertex. An LOD interpolant value for a vertex is calculated as a function of the plurality of parameters of the vertex. A final LOD value for a pixel of the primitive is interpolated as a function of the LOD interpolant value of the pixel corresponding to the vertex and a view distance of the pixel at the time of rasterization.

In yet another embodiment, a graphics processor includes a setup module, a raster module and a data fetch module. The data fetch module is communicatively coupled to the raster module. The raster module is communicatively coupled to the setup module. The setup module receives drawing commands and parameters describing a geometric primitive: The setup module calculates an LOD interpolant value for each texture coordinate set for each vertex of the geometric primitive. The raster module receives the LOD interpolant value for each texture. The raster module interpolates a final LOD value, as a function of the LOD interpolant values of the vertices, for one or more pixels of the geometric primitive. The data fetch module receives the final LOD values and fetches texture data stored in a mip-map as a function of the LOD values of each pixel.

Embodiments of the present invention advantageously reduce the computational workload of the graphics processor, as compared to conventional graphics processors. The reduction in computation workload reduces power consumption by the graphics processor.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Embodiments of the present invention provide a method and system for implementing interpolation the level-of-detail (LOD) parameter for primitives. Embodiments of the present invention advantageously evaluate the LOD at the vertices of the primitives, and interpolate the LOD parameter over the interior pixels. Limiting the need to evaluate the LOD parameter to the vertex and performing interpolation at the pixels reduces power expenditures and reduces the number of circuit elements. Embodiments of the present invention and their benefits are further described below.

Figure 1A:
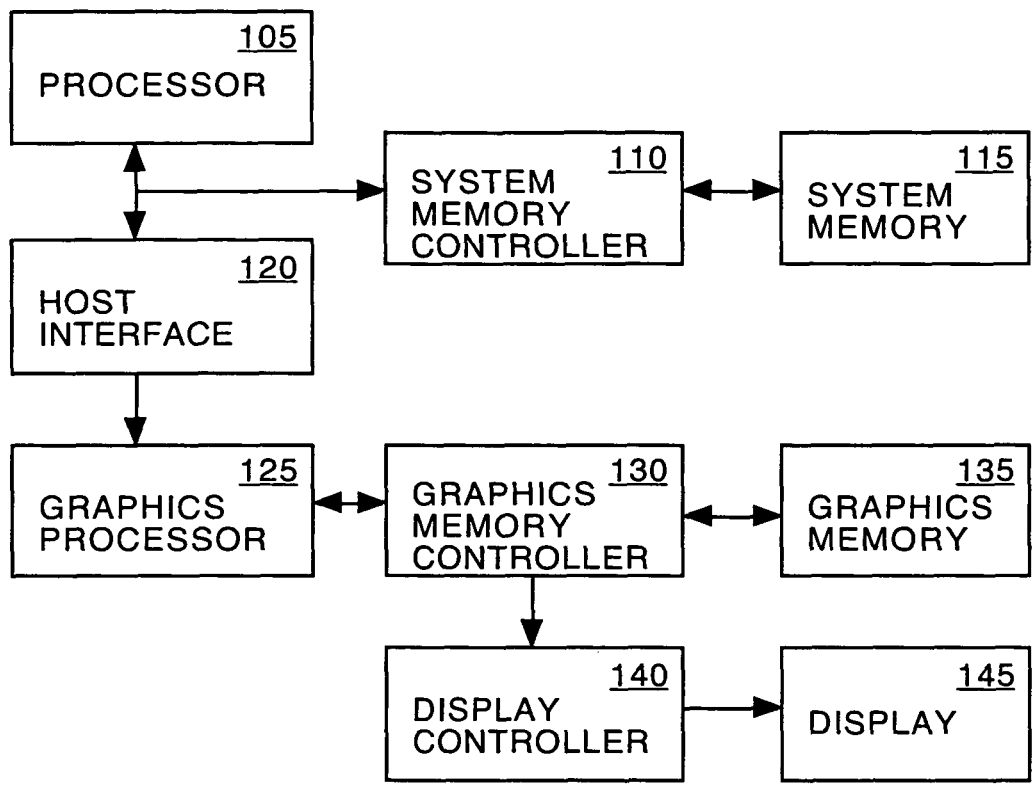
FIG. 1A shows a block diagram of exemplary computing device architecture for implementing embodiments of the present invention.
Figure 1B:
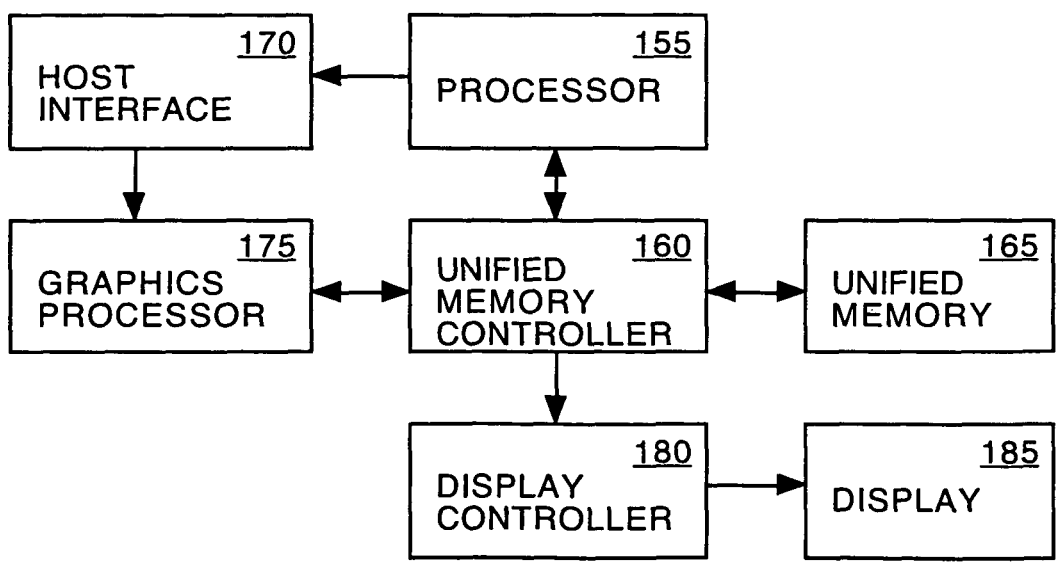
FIG. 1B shows a block diagram of another exemplary computing device architecture for implementing embodiments of the present invention.

Referring to FIGS. 1A and 1B, block diagrams of exemplary computing device architectures for implementing embodiments of the present invention, are shown. The computing device may be a cellular telephone, PDA or other portable wireless appliance, navigation system (e.g., map enabled GPS), palm-sized computer, tablet computer, game console, personal entertainment center, media center PC, computer based simulator, desktop computer, laptop computer, or the like. The computing device architectures provide the execution platform for implementing certain software-based functionality of embodiment of the present invention. As depicted in FIG. 1A, a first computing device may include a processor 105, system memory controller 110, system memory 115, host interface 120, graphics processor 125, graphics memory controller 130, graphics memory 135, display controller 140 and display 145. The processor 105 may be communicatively coupled to the system memory 115 through the system memory controller 110. The processor 105 may also be communicatively coupled to the graphics processor 125 through the host interface 120. The graphics processor 125 may be communicatively coupled to the graphics memory 135 through the graphics memory controller 130. The graphics memory controller 130 may also communicatively couple the display controller 140 to the graphics memory 135. The display 145 may be communicatively coupled to the display controller 140.

The processor 105 provides one or more applications by operating on instructions (e.g., computer executable code) and information (e.g., data) stored in the system memory 115 (e.g., computer-readable memory). The system memory controller 110 controls the flow of such information and instructions between the processor 105 and the system memory 115. Images to be output on the display 145 may be off-loaded to the graphics processor 125 by the processor 105. The images are off-loaded by transferring geometric primitive parameters (e.g., vertex data representations of triangulated three-dimensional models of objects), draw commands and instructions for controlling the operation of the graphics processor 125. The primitive parameters, draw commands and instructions are transferred from the processor 105 to the graphics processor 125 under control of the host interface 120. In one implementation, a widely implemented graphics application programming interface, such as the OpenGL-ES™ graphics language, Direct3D™, or the like, is utilized for the software interface between the graphics processor 125 and the applications provided by the processor 105.

The graphics processor 125 generates a color and depth value for each pixel of the display 145 in response to the received primitives, draw commands and instructions. In one implementation, the primitive parameters are stored in a first buffer local to the graphics processor 125. The graphics processor 125 performs geometrical calculations (e.g., transforms) on the primitive in accordance with the draw commands. The graphics processor 125 also performs rasterization wherein values from the geometrical calculations are mapped to corresponding pixels in the display space. The graphics processor 125 also retrieves color, texture and depth information from the graphics memory 135. The graphics memory controller 110 controls the flow of such information between the graphics memory 135 and the graphics processor 125. The color, texture and depth information may be cached local to the graphics processor 125.

The color and depth value of each pixel may then be determined by the graphics processor 125 upon applying such functions as texture mapping, fogging, alpha testing, depth testing for culling occluded pixel, alphablend color combining and the like. The color of each pixel may then be cached in a second buffer local to the graphics processor 125. When the second buffer is filled, the output pixel data (e.g., color and depth value of each of a plurality of pixels) may then be stored by the graphics processor 125 in the graphics memory 135 under control of the graphics memory controller 130. The display controller 180 reads the output pixel data out of the graphics memory 135, under control of the graphics memory controller 130. The display controller 180 generates scan control signals, from the pixel data, for output to the display 145. An image is project by the display 145 as a function of the scan control signals.

As depicted in FIG. 1B, a second computing device may include a processor 155, host interface 170, graphics processor 175, unified memory controller 160, unified memory 165, display controller 180 and display 185. The processor 155 may be communicatively coupled to the unified memory 165 through the unified memory controller 160. The processor 155 may also be communicatively coupled to the graphics processor 175 through the host interface 170. The graphic processor 175 may be communicatively coupled to the unified memory 165 through the unified memory controller 160. The unified memory controller 160 may also communicatively couple the display controller 180 to the unified memory 165. The display 185 may be communicatively coupled to the display controller 180.

The processor 155 provides one or more applications by operating on instructions (e.g., computer-executable code) and information (e.g., data) stored in the unified memory 165 (e.g., computer-readable memory). The unified memory controller 160 controls the flow of such information and instructions between the processor 155 and the unified memory 165. Images to be output on the display 185 may be off-loaded to the graphics processor 175 by the processor 155. The images are off-loaded by transferring geometric primitive parameters (e.g., vertex data), draw commands and instructions for controlling the operation of the graphics processor 175. The primitive parameters, draw commands and instructions are transferred from the processor 155 to the graphics processor 175 under control of the host interface 170. In one implementation, a widely implemented graphics application programming interface, such as the OpenGL-ES™ graphics library, Direct3D™, or the like, is utilized for the software interface between the graphics processor 175 and the applications provided by the processor 155.

The graphics processor 175 generates a color and depth value for each pixel of the display 185 in response to the received primitives, draw commands and instructions. In one implementation, the primitive parameters are stored in a first buffer local to the graphics processor 175. The graphics processor 175 performs geometrical calculation (e.g., transforms) on the primitive in accordance with the draw commands. The graphics processor 175 also performs rasterization wherein values from the geometrical calculations are mapped to corresponding pixels in the display space. The graphics processor 175 also retrieves color, texture and depth information from the unified memory 165. The unified memory controller also controls the flow of such information between the graphics processor 175 and the unified memory 165. The color, texture and depth information may be cached local to the graphics processor 175.

The color and depth values of each pixel may then be determined by the graphics processor 175 upon applying such functions as texture mapping, fogging, alpha testing, depth testing for culling occluded pixels, alphablend color combining and the like. The color of each pixel may then be cached in a second buffer local to the graphics processor 175. When the second buffer is filled, the output pixel data (e.g., color and depth value of each of a plurality of pixels) may then be stored by the graphics processor 175 in the unified memory 165, under control of the unified memory controller 160. The display controller 180 reads the output pixel data output from the unified memory 165, under control of the unified memory controller 160. The display controller 180 generates scan control signals, from the pixel data, for output to the display 185. An image is projected by the display 185 as a function of the scan control signals.

Figure 2:
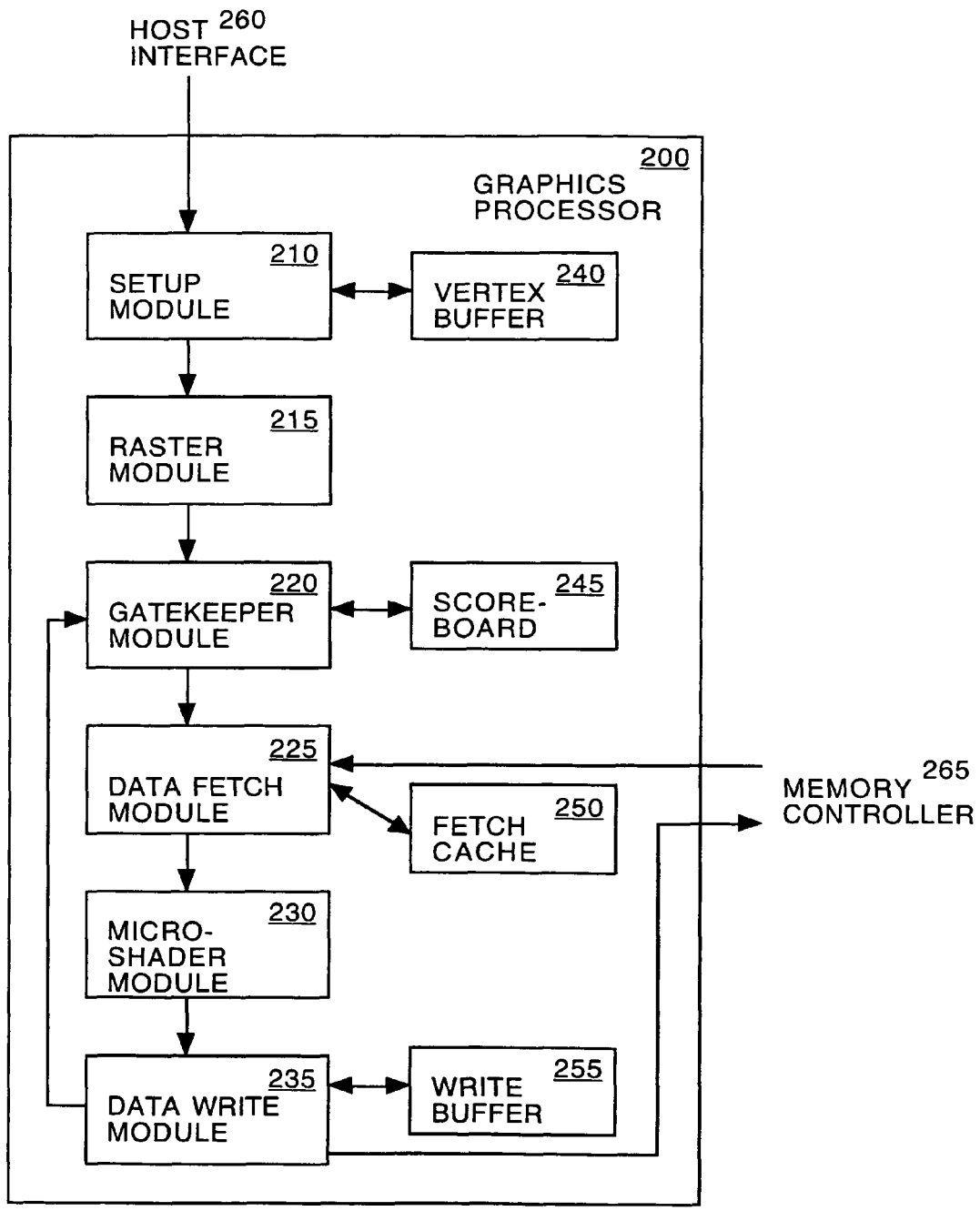
FIG. 2 shows a block diagram of a graphical processor, in accordance with one embodiment of the present invention.

Referring now to FIG. 2, a block diagram of a graphical processor 200, in accordance with one embodiment of the present invention, is shown. As depicted in FIG. 2, the graphical processor 200 includes a setup module 210, a raster module 215, a gatekeeper module 220, a data fetch module 225, a micro-shader module 230, and a data write module 235. The graphics processor 200 may further include a vertex buffer 240, a scoreboard 245, a fetch cache 250 and/or a write buffer 255. The modules 210-235 of the graphical processor 330 are arranged in a pipeline architecture.

The setup module 210 may be communicatively coupled to a host interface 260. The setup module 210 receives geometric primitives (e.g., parameters defining a polygon in three-dimensional space), draw commands and instructions (e.g., for controlling operation of the modules 210-253) from the host interface 260. The setup module 210 prepares parameters (e.g., vertex data) of the primitives for rasterization. In one implementation, the primitives include parameters describing the three vertices of a triangle in three-dimensional space. The setup module 210 supports input formats of 32 bit IEEE floating point, 32 bit S15.16 fixed point (e.g., OpenGL-ES™ fixed standard) and/or 8 bit packet (e.g., for colors) data packets. The data packets may contain up to 24 parameters in addition to x, y, z, and w parameters, per primitive.

The setup module 210 may be communicatively coupled to the vertex buffer 240. The vertex buffer 240, in one implementation, includes storage (e.g., a plurality of discrete slots) for 256 words (e.g., vertex words). In one implementation, the discrete slots may either be in 8 or 16 word vertex formats, under control of software. Primitive parameters (e.g., three-dimensional vertex data) may be loaded from the host interface 260 into the vertex buffer 240 through the setup module 210, under software control. Although the host interface 260 is communicatively coupled to the setup module 210, the host interface 260 may effectively load vertex data directly into the vertex buffer 240.

A transform (e.g., matrix multiplication) is performed upon the vertices to convert the three-dimensional arbitrary space that a given application is working in to the two-dimension display space that is being projected onto (e.g., view surface). The transform process is not automatically performed when vertex data is loaded into the vertex cache 250 by the host interface 260.

Figure 4A:
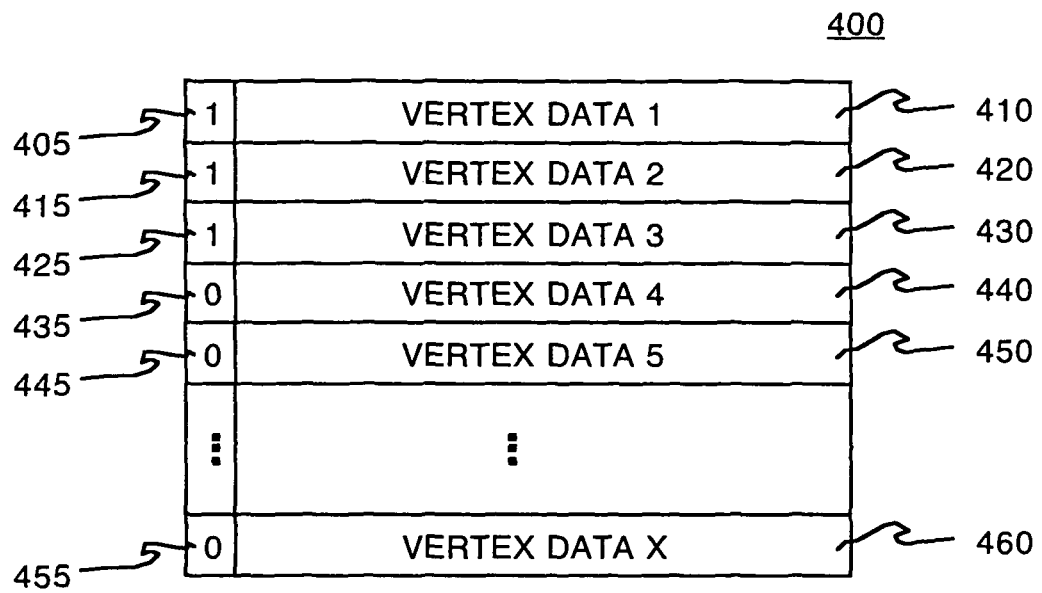
FIGS. 4A and 4B show an exemplary vertex buffer, in accordance with one embodiment of the present invention.
Figure 4B:
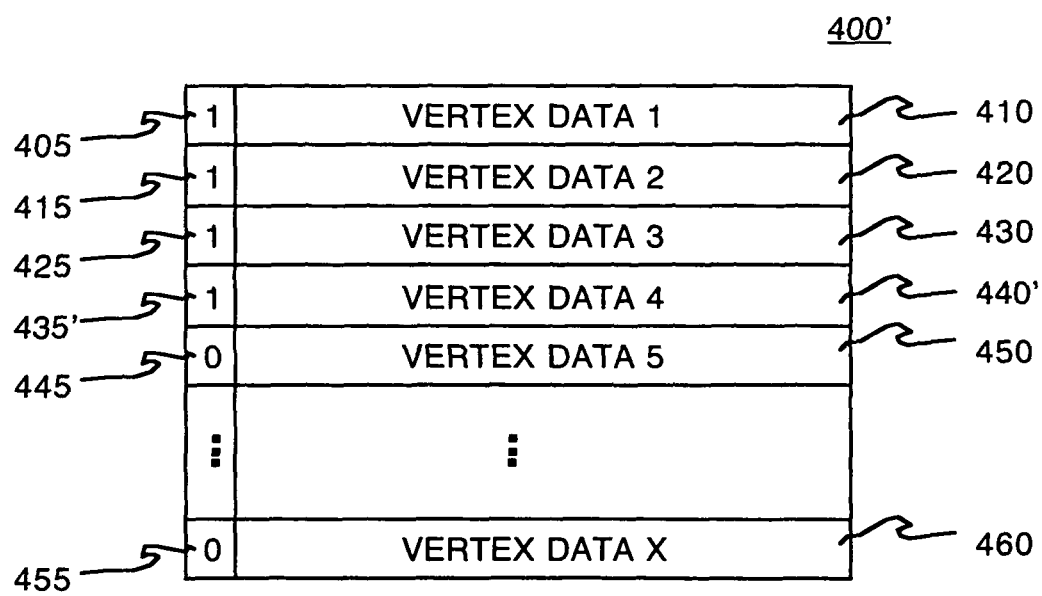

Referring now to FIGS. 4A and 4B, an exemplary vertex buffer, in accordance with one embodiment of the present invention, is illustrated. As depicted in FIG. 2 in conjunction with FIGS. 4A and 4B, a transform indicator bit 405 is associated with each vertex word 410 stored in the vertex buffer 240. The associated transform indicator bit 405 indicates whether the given vertex word 410 has been transformed. When the host interface 260 loads a vertex word (e.g., 435) into the vertex buffer 240, the data is in three-dimensional space and therefore the associated transform indicator bit (e.g., 440) is set to a first state (e.g., cleared). When the setup module 210 accesses a draw command from the host interface 260, the setup module 210 retrieves vertex data, applicable to the given draw command, from the vertex buffer 240. The state of the associated transform indicator bit is checked upon retrieving the given vertex data. If the given vertex word is three-dimensional data (e.g., 440) as indicated by the transform indicator bit, the setup module 210 transforms the given vertex data from three-dimensional into a two-dimensional representation. The vertex word (e.g., 440) may be over written with the transformed (e.g., two-dimensional) vertex word (e.g., 440') and the associated transform indicator bit (435') is set to a second state (e.g., set). For a given triangle, if its indicator bit indicates transformed data, then the triangle is accessed directly for rasterization without transformation required. After transformation, the setup module stores the vertex data back to the vertex buffer and sets the indicator bit to indicate the transformation state.

Figure 6:
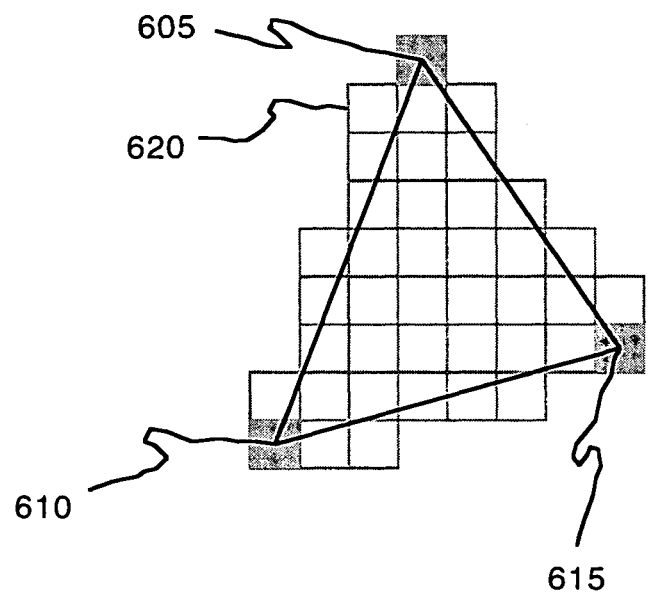
FIG. 6 shows an exemplary primitive, in accordance with one embodiment of the present invention.

Referring now to FIG. 6, an exemplary primitive, in accordance with one embodiment of the present invention, is illustrated. As depicted in FIG. 2 in conjunction with FIG. 6, the level-of-detail (LOD) for each vertex 605-610 of the given primitive is also calculated by the setup module 210. Calculation of the LOD includes determining the approximate area of each vertex pixel projected into the image space (e.g., the area of each box represents an area of an exemplary pixel projected into the image space). In the conventional art, an LOD value of each vertex of a primitive may be calculated as a function of the primitive's vertex X coordinate value, the vertex Y coordinate value, the texture S coordinate value and the texture T coordinate value according to Equation 1, as follows:

$$\text{LOD} = \text{Log}_2(\max(\text{sqrt}(ds/dx^2 + dt/dx^2), \text{sqrt}(ds/dy^2 + dt/dy^2))) \qquad (1)$$

In accordance with embodiments of the present invention, LOD interpolant values (LOD_interp(n)) of the vertices of a triangular primitive determined prior to calculating the logarithm base two. The pre-Log$_2$( ) LOD is also divided by the square of a homogeneous view distance (w) squared for each vertex (n) according to Equation 2, as follows:

$$\text{LOD\_interp}(n)=[\max(\sqrt{ds/dx(n)^2+dt/dx(n)^2},\sqrt{(ds/dy(n)^2+dt/dy(n)^2)})]/w(n)^2 \quad (2)$$

It is appreciated that the pre-Log$_2$( ) LOD should actually be divided by $w(n)^4$ (e.g., based on the partial derivatives of the pre-Log$_2$( ) LOD calculations with respect to changes in X and Y). However, using $w(n)^2$ is sufficiently accurate to provide relatively good quality images as perceived by the human eye under substantially all circumstances. Utilizing $w(n)^2$ advantageously reduces computation costs and the dynamic range. Upon determining the LOD interpolant values of the vertices, they may be interpolated just like any other perspective-correct primitive parameter.

Accordingly, the LOD calculations are done on a per primitive basis, as opposed to per-pixel. Calculating the LOD on a per-primitive basis reduces power consumption by the graphics processor 200. The LOD values of the vertex pixels may then be utilized in the raster module 215 to interpolate the LOD values of the other pixels in the given primitive based on the vertex data.

In one implementation, the setup module 210 calculates barycentric coefficients for rastering. In a barycentric coordinate system, distances in primitives (e.g., triangles) are measured with respect to its vertices. The use of barycentric coordinates reduces the required dynamic range, which permits using fixed-point calculations that require less power than floating point calculations. The two-dimensional parameters (e.g., barycentric) are sent from the setup module to the raster module. The setup module 210 may also perform clipping and viewporting operations. The setup module 210 may also perform culling of back-facing primitives and occlusion. Thus, culling and occlusion operations are performed before texturing and shading. Eliminating pixels, as a result of culling and/or occlusion, before texturing and shading reduces power consumption and reduces the associated memory accesses by the data fetch module 225 and the data write module 235. The setup module 210 may also support guardband clipping, power management for the rest of the pipeline, and/or collection of statistics from other modules 215-235, buffers 240, 255, caches 250 and/or the scoreboard 245.

The raster module 215 may be communicatively coupled to the setup module 210. The raster module 215 receives instructions and applicable transformed vertex data and performs rasterization thereupon. The raster module 215 determines which pixels on a screen correspond to a given polygon as defined by the transformed vertex data. Rasterizing includes "walking" the primitive and generating pixel packets that contain parameters (e.g., set of descriptions for each pixel). The raster module 215 also determines shader processing operations to be performed, as part of rendering, on each pixel, such as color, texture and fog operations. Hence, the raster module 215 converts from per polygon (e.g., triangle) to per pixel processing.

The raster module 215 generates at least one pixel packet for each pixel of a primitive. Each pixel packet includes fields for a payload of pixel parameters required for processing, an instruction sequence of operation to be performed on the pixel packet, and sideband information. The payload of the pixel may include color values, texture coordinates (e.g., S and T), X coordinate values, Y coordinate values, Z depth values, LOD values and the like. In one implementation, the color field may be a pair of 8-bit precision color values, or packed 5555 ARGB color values. The texture field may be 16-bit S and T coordinates, with a 4-bit LOD value. The depth field may be a 16-bit value. In one implementation, the sideband information includes a valid field, a kill field, packet type descriptor (whether the packet is a register write or contains pixel data) or the like. The generated pixel packets may be four 20-bit variables per row, and up to 4 rows. The generated pixel packets may also include 4 high-precision and 4 low-precision perspective-corrected iterated values per row.

The raster module 215 interpolates the LOD of the pixels from the calculated LOD interpolant values of the primitive vertices 605-615. However, a straight interpolation across the primitive (e.g., triangle) will provide relatively poor image quality. Accordingly, the final LOD (final_LOD(0) for each pixel is interpolated according to Equation 3:

$$\text{final\_LOD}(i)=\text{Log}_2(\text{LOD\_interp}(n))*W^2) \quad (3)$$

where final LOD(i) are interpolated values of LOD for a respective pixel, i, of the pixels. Equation 3 may be evaluated for each texture to be applied to the pixels of the primitive. Assuming that a fast approximation of the logarithm base two is available, Equation 3 can be simplified as given by Equation 4:

$$\text{final\_LOD}(i)=\text{approx\_Log}_2(\text{LOD\_interp})+\text{Log}_2(w*2) \quad (4)$$

The final LOD of each pixel is clamped between zero and Log$_2$ (N), where N is the maximum dimension of the largest texture supported by the device. The LOD value has an integer portion and a fractional portion. In one implementation, an eight-bit value representing the LOD of each pixel, where four integer bits indicate which of a plurality of mip-map levels to use and four factional bits are utilized to interpolate the mip-map level.

It is appreciate that if there are many texels (texture elements) in a given pixel, than an average texel (e.g., filtered value) may be determined. In mip-mapping the texture is pre-filtered into a plurality of resolutions. For example, a first file of the texture has a first resolution, a second file has a quarter of the resolution of the primary texture, a third file has a sixteenth of the resolution, and so on until a last file contains a single value (e.g., the overall average value) for the texture. The LOD value for each pixel is utilized to determine an appropriate mip-map level such that the texel corresponds one-to-one with the screen space pixel.

The LOD filtering provided by mip-mapping is configured to prevent moiré interference patterns, aliasing, and rendering artifacts by scaling and filtering a full resolution texture map into multiple lower resolution versions. The integer portion of the computed LOD value is used to select the correct mip-map level corresponding to the primitive's distance from the viewpoint. For example, a 4-bit LOD value may be utilized to access one of 0 through 15 mip-map levels. The fractional portion of the computed LOD value is used to configure a blending operation performed on corresponding texels in corresponding mip-map levels. For example, the fractional portion is used to assign different weights to texels of corresponding mip-map levels.

The shader operations do not utilize LOD parameter values that are outside of the range of zero to Log$_2$(N). Thus, the raster module 215 is configurable to clamp the LOD value to a maximum value if a computed LOD value is greater than a predetermined range. Similarly, the LOD may be clamped to a minimum value if a computed LOD value is less than the predetermined range. In other words, when the computed LOD parameter corresponds to a texel:pixel ratio, for the primitive, that is larger than the coarsest (smallest) mip-map level, the LOD value may be clamped to the maximum range value. When the computed LOD parameter corresponds to a texel:pixel ratio that is smaller than the finest (largest) mip-map level, the LOD value may be clamped to this minimum range value. In one implementation, once the LOD value is clamped to the minimum or maximum range value, the fractional portion may also be clamped. Alternatively the fractional portion may be discarded. For example, in a case where the maximum LOD parameter value has been exceeded (e.g., mip-map level 15), the lowest resolution version will be fetched by the data fetch module 220. The fractional portion would be insignificant with respect to any blending process.

The gatekeeper module 220 may be communicatively coupled to the raster module 215. The gatekeeper module 220 may also be communicatively coupled to the scoreboard 245. The gatekeeper module 220 provides data flow control (e.g., regulates the flow of pixels through the pipeline). The gatekeeper module 220 attempts to keep the pipeline as full as possible, such that the modules operate on substantially every clock. To facilitate data flow control, the scoreboard 245 tracks the entry and retirement of pixels in the pipeline. In one implementation, a corresponding bit in the scoreboard 245 is set when a pixel packet is received from the raster module 215 by the gatekeeper module 220. The corresponding bit in the scoreboard 245 is reset as the pixel packet drains out of the graphic processor 200.

The scoreboard 245 is utilized by the gatekeeper module 220 for scheduling, load balancing, resource allocation and hazard avoidance of pixel packets. The gatekeeper module 220 also utilizes the scoreboard 245 to ensure cache coherency for the data fetch 225 and data-write modules 235. By tracking the entry and retirement of pixel packet utilizing the scoreboard 245, the gatekeeper module 220 prevents coincident pixels from entering the micro-shader module 230. The gatekeeper module 220 also utilizes the scoreboard 245 to support recirculation of pixel packets for complex shader operations. The gatekeeper module 220 may also detects micro-shader 230 idle conditions. The gatekeeper module 220 may also handle debug register reads.

The data fetch module 225 may be communicatively coupled to the gatekeeper module 320 and a memory controller 265. The data fetch module 225 may also be communicatively coupled to the fetch cache 250. The data fetch module 225 performs color, texture and depth data reads from memory (not shown) for each pixel packet flowing through the pipeline. The data fetch module 225 reads data from memory and buffers the data in the fetch cache 250. In one implementation, the data fetch module 225 reads data from memory in 128 bit chunks (e.g., the width of the communication channel between the graphics processor and the memory controller). In one implementation the fetch cache 250 may be partitioned into a color cache, texture cache and depth cache. Alternatively the fetch cache 250 may be composed of separate caches for storing color, texture and depth information. The data fetch module 225 inserts the appropriate color, texture and depth information into each pixel packet prior to sending the pixel packet onto the micro-shader module 230.

It is appreciated that because previous and subsequent pixels are spatially related to each other, such that there is a reasonable probability that the color, texture and/or depth data buffered in the fetch cache 250 may be utilized from subsequent pixel packets. Therefore, the bandwidth utilization of the communication channel between the graphics processor 200 and the memory controller 265 may be reduced, if a subsequent pixel packets can utilize color, texture and/or depth data buffered in the fetch cache 250, which were retrieved for a previous pixel packet.

The micro-shader module 230 may be communicatively coupled to the data fetch module 325. The micro-shader module 230, in one implementation, includes one or more arithmetic logic units (ALU). Each arithmetic logic unit implements a unified arithmetic function. In one implementation, each ALU performs a plurality of scalar arithmetic logic operations in the form of [a*b "op" c*d] on a set of input parameters, where "op" represents a programmable operation and * is a multiplication operation. The input parameters may be one or more parameters from a given pixel packet, one or more previous result values and/or one or more constants. The arithmetic logic operation may implement functions such as a fog algorithm, alpha blend algorithm, alpha test algorithm and/or a texture combine operation. The ALU may simultaneously perform different operations, thereby improving the functionality of the ALU and decreasing power consumption, as compared to conventional graphics processors. The output of the micro-shader module 230 is a color and depth value for a given pixel of the display.

The data write module 235 may be communicatively coupled to the ALU modules 230 and the memory controller 270. The data write module 235 may also be communicatively coupled to a write buffer 260 and/or the gatekeeper module 220. The data write module 235 send the resultant pixel data, calculated by the ALU module, out to memory controller 265. In one implementation, the communication channel between the graphics processor 200 and the memory controller 270 is 128-bits wide and the pixel data is 16-bits. Therefore, the resultant pixel data is buffered in the write buffer until 128 bits are accumulated. The accumulated resultant pixel data is output to the memory controller 270 for storage in memory. By buffering the resultant pixel data, efficient use of the communication channel bandwidth may be achieved.

The data write module 235 may also indicate retired writes to the scoreboard 245, thereby keeping data consistent. The data write module 235 may also recirculate pixel packets for further processing. In one implementation, the data write module 235 may optionally dither to 565 colors.

Each module 210-235 of the graphics processor 200 is sub-block clocked. Sub-block clocking enables disabling of the clock tree for a given sub-block which is idle (e.g., command and/or data path). Furthermore, the logic is designed to minimize active regions of the logic cone. For example, the logic cone is optimized such that power is consumed when an operation is performed as opposed to every clock cycle. Thus, if an operation is not performed on a pixel packet in a block of a given module 210-235 during a clock cycle, power savings propagate down the logic tree of the pipeline.

Figure 3A:
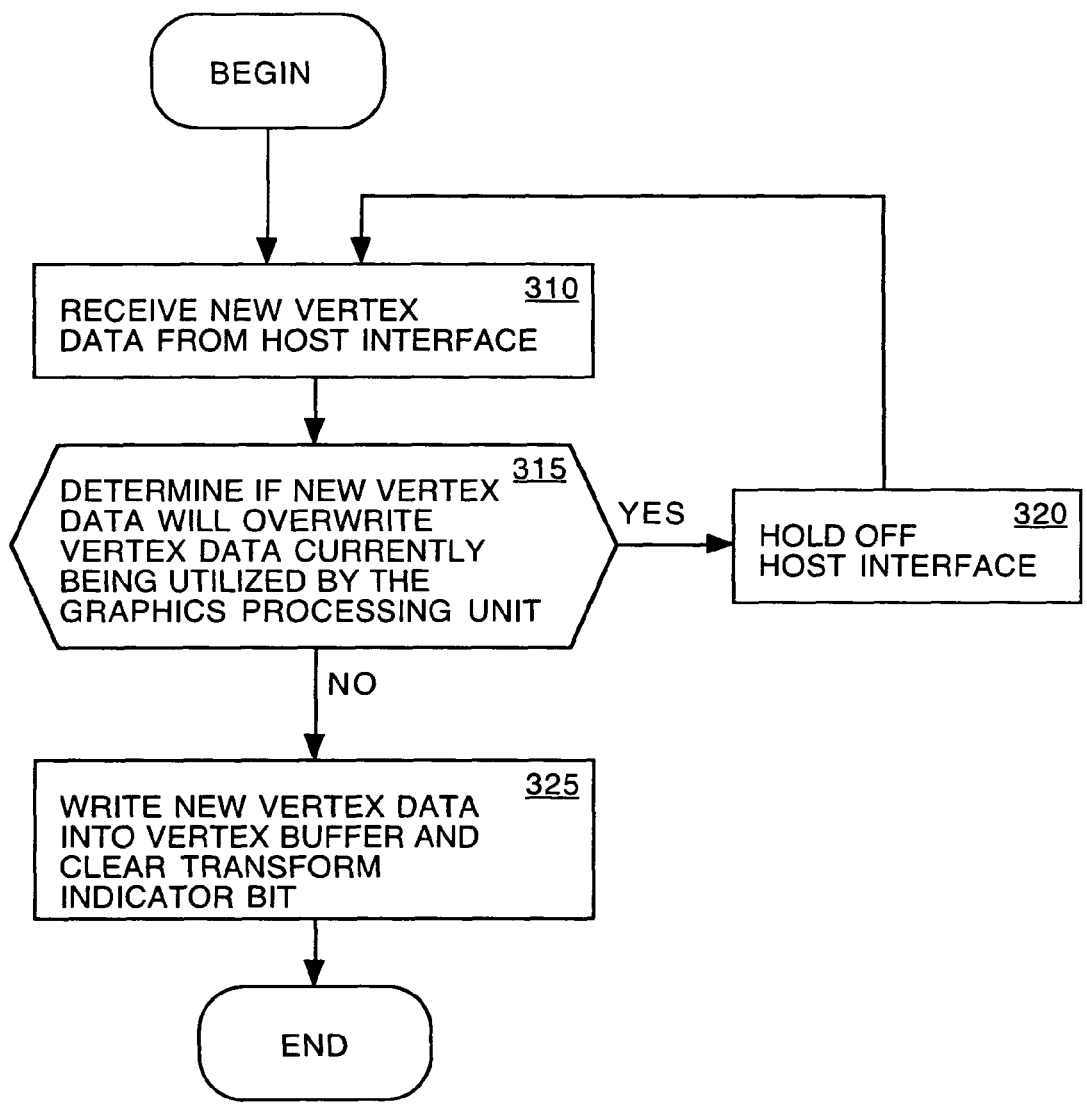
FIGS. 3A and 3B show a flow diagram of an exemplary method of deferred transform evaluation, in accordance with one embodiment of the present invention.
Figure 3B:
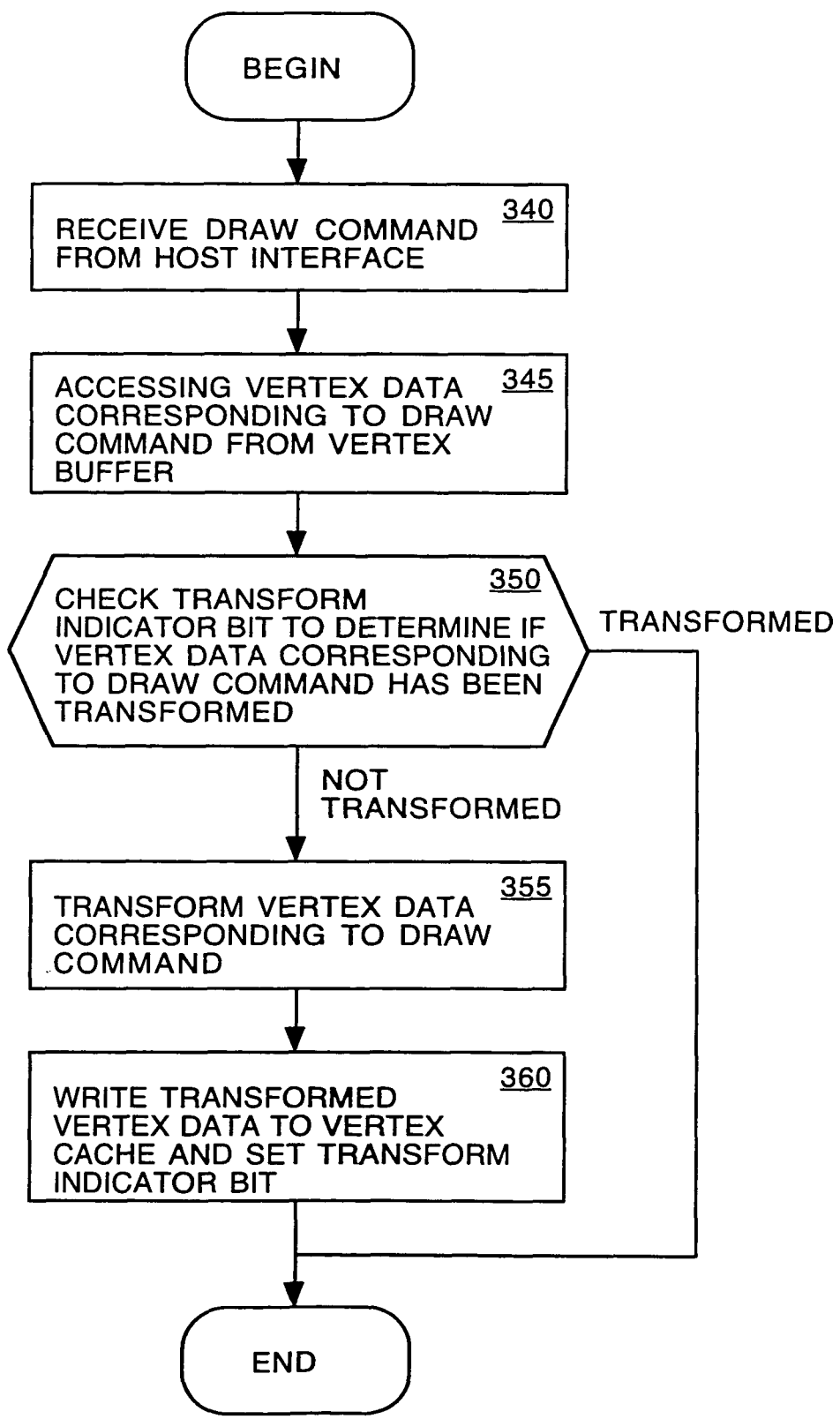

Referring now to FIGS. 3A and 3B, a flow diagram of an exemplary method of deferred transform evaluation, in accordance with one embodiment of the present invention, is shown. As depicted in FIGS. 3A and 3B, in conjunction with FIGS. 4A and 4B, the method of deferred transform evaluation includes receiving vertex data of a geometric primitive from a host interface, at 310. At 315, it is determined by an interlocking mechanism if the new vertex data will overwrite vertex data currently being utilized. If the new vertex data received from the host interface will overwrite vertex data currently involving a draw command, the host interface is held off from loading the new vertex data into the vertex buffer 400, at 320. If the new vertex data will not overwrite vertex data currently involving a draw command, the host interface loads the new vertex data (e.g., 440, 450, 460) into the vertex buffer 400 and clears the an associated transform indicator bit (e.g., 435, 445, 455) in the vertex buffer 400, at 325.

The method of deferred transform evaluation further includes receiving a draw command from the host interface, at 340. At 345, the vertex data corresponding to the draw command is retrieved from the vertex buffer 400. At 350, it is determined, from the state of transform indicator bit, if the retrieved vertex data has been transformed. If the vertex data (e.g., 440) is three-dimensional data of a graphics primitives, as indicated by the corresponding transform indicator bits (e.g., 435), the vertex data is transformed into a two-dimensional representation, at 355. At 360, the transformed vertex data (e.g., 440') is written back to the vertex buffer 400' and the corresponding transform indicator bit (e.g., 435') is set. If the retrieved vertex data (e.g., 430) has already been transformed into a two-dimensional representation, the transform process 355 and corresponding write back process 360 are not performed.

Accordingly, transforms are not automatically performed when vertex data is loaded into the vertex buffer 400. In addition, if a given vertex data has already been transformed as a result of a previous draw command of a primitive that shared the given vertex datum, the repeated transform of the given vertex data may be advantageously eliminated. Eliminating the repeated transform of vertex data currently stored in the vertex buffer 400 reduces power consumed by the graphics processor. Furthermore, it is appreciated that the transform-indicator bit enables storage of pre-transform vertex data and post-transform vertex data in a single vertex buffer 400. Hence, the hardware (e.g., transistors implementing the registers utilized to store vertex data) of the graphics processor may be reduced. In addition, the sharing of a single vertex buffer allows the same underlying hardware units (multipliers, adders and the like) to be utilized by both the transformation and setup calculations by virtue of the inherent arbitration between said calculations, further reducing cost and complexity.

Figure 5:
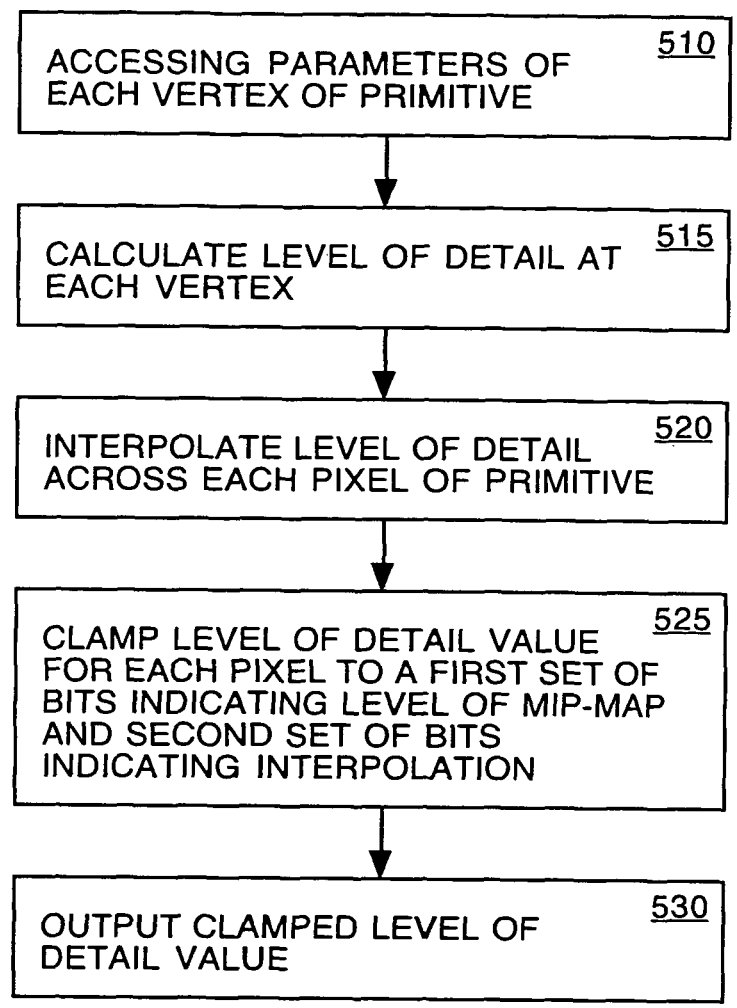
FIG. 5 shows a flow diagram of a method of interpolating level-of-detail (LOD), in accordance with one embodiment of the present invention.

Referring now to FIG. 5, a flow diagram of a method of interpolating level-of-detail, in accordance with one embodiment of the present invention, is shown. As depicted in FIG. 5, the method of interpolating the level-of-detail begins with receipt of parameters for each vertex of a given geometric primitive, at 510. Each vertex is specified by a plurality of parameters, such as a primitive X coordinate value, a Y coordinate value, and a W coordinate value (e.g., view distance). At 515, the level-of-detail (LOD) is calculated at each vertex. The LOD of each vertex may be calculated according to Equation 2 for each texture. In one implementation, the LOD of each vertex varies across the triangle as a function of $1/W^2$.

At 515, the LOD of the pixels of the primitive may be interpolated from the LOD values of the primitive vertices according to Equation 4. The LOD value is between zero and $Log_2(N)$, where N is the maximum texture dimension supported by the device. The LOD value includes an integer portion and a fractional portion. In one implementation, the LOD value is encoded as an eight-bit representation. Four bits (e.g., integer portion) indicate which of a plurality of mip-map levels to fetch and four bits (e.g., fractional portion) are utilized to interpolate the texel in the specified mip-map level.

At optional process 525, the integer portion and/or the fractional portion of the LOD value may be clamped. For example, if the calculated LOD is less than a zero, than the integer portion of the LOD value is clamped to zero and the fractional portion may be discarded. If the calculated LOD is greater than $Log_2(N)$, than the integer portion of the LOD value is clamped to maximum resolution and the fractional portion may be discarded. Alternatively, if the calculated LOD is less than a zero, than the integer portion of the LOD value is clamped to zero and the fractional portion may also be clamped. If the calculated LOD is greater than $Log_2(N)$, than the integer portion of the LOD value is clamped to maximum resolution and the fractional portion may also be clamped. The clamped LOD value may then be output, at 530.

In the conventional art, the LOD is calculated for each pixel in a given primitive based on the pixel's other parameters. In embodiments of the present invention, the level-of-detail (LOD) is calculated once per vertex of a given primitive. It is appreciated that a given triangle has only three vertexes, but typically has hundreds of pixels. Hence, the computational workload of graphics processors, in accordance with embodiments of the present invention, is advantageously reduced as compared to conventional graphics processors because interpolation is more efficient than computation of the LOD values according to the conventional technique. The reduction in computation workload reduces power consumption by the graphics processors.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. One or more computing device readable medium having stored thereon, computing device executable instructions that, if executed by a computing device cause the computing device to perform a method comprising:
   accessing a geometric primitive comprising a plurality of vertices wherein each vertex has associated therewith a plurality of parameters including a respective level-of-detail interpolant (LOD_interp) value and a respective view distance (W) value, and wherein said level-of-detail interpolant value is determined according to, $$LOD\_interp=[max(sqrt(ds/dx(n)^2+dt/dx(n)^2),sqrt(ds/dy(n)^2+dt/dy(n)^2))]/w(n)^2,$$

wherein said level-of-detail interpolant is interpolated for a respective vertex, n, of said primitive;
   during rasterization of said geometric primitive, calculating respective final LOD values (final_LOD(i)) for pixels of said geometric primitive according to:

$$final\ LOD(i)=Log\ 2(LOD\_interp)+Log\ 2(W^*2),$$

wherein LOD(i) is interpolated for a respective pixel, i, of said pixels, LOD_interp is said level-of-detail interpolant value of said vertex, and W is a respective view distance value for said respective pixel.

2. The one or more computing device readable medium having stored thereon, computing device executable instructions that, if executed by a computing device cause the computing device to perform the method as described in claim 1, wherein said respective W value of each vertex is related to depth of said associated vertex.

3. The one or more computing device readable medium having stored thereon, computing device executable instructions that, if executed by a computing device cause the computing device to perform the method as described in claim 1, wherein said interpolating is performed in a raster module of said graphics pipeline wherein said raster module is coupled to a setup module.

4. The one or more computing device readable medium having stored thereon, computing device executable instructions that, if executed by a computing device cause the computing device to perform the method as described in claim 1, wherein said level-of-detail interpolant value is a function of an X coordinate, a Y coordinate, an S coordinate, a T coordinate and an inverse of a square of a view distance W.

5. The one or more computing device readable medium having stored thereon, computing device executable instructions that, if executed by a computing device cause the computing device to perform the method as described in claim 1, wherein said final LOD value for each pixel i comprises an integer portion and a fractional portion.

6. The one or more computing device readable medium having stored thereon, computing device executable instructions that, if executed by a computing device cause the computing device to perform the method as described in claim 5, wherein said integer portion of said final LOD value is used to determine a particular mip-map for use in texture mapping of each pixel.

7. The one or more computing device readable medium having stored thereon, computing device executable instructions that, if executed by a computing device cause the computing device to perform the method as described in claim 5, wherein said fractional portion is 4-bits wide.

8. The one or more computing device readable medium having stored thereon, computing device executable instructions that, if executed by a computing device cause the computing device to perform the method as described in claim 1, wherein said final LOD(i) value for each pixel i is clamped within a predetermined range.

9. One or more computing device readable medium having stored thereon, computing device executable instructions that, if executed by a computing device cause the computing device to perform a method comprising:
  accessing a plurality of geometric primitive parameters of a vertex;
  calculating a level-of-detail interpolant value for said vertex as a function of said plurality of parameters of said vertex including an X coordinate value, a Y coordinate value and an inverse of a view distance (W) value of said vertex to the fourth power; and
  calculating a final level-of-detail value for a pixel of said geometric primitive as a function of said level-of-detail interpolant value for said vertex and a view distance of said pixel.

10. The one or more computing device readable medium having stored thereon, computing device executable instructions that, if executed by a computing device cause the computing device to perform the method as described in claim 9, wherein each of said final level-of-detail values comprise an integer portion and a fractional portion.

11. The one or more computing device readable medium having stored thereon, computing device executable instructions that, if executed by a computing device cause the computing device to perform the method as described in claim 10, wherein said integer portion specifies a texture mip-map level.

12. The one or more computing device readable medium having stored thereon, computing device executable instructions that, if executed by a computing device cause the computing device to perform the method as described in claim 11, wherein said specified adjacent texture mip-map levels are interpolated as a function of said fractional portion.

13. The one or more computing device readable medium having stored thereon, computing device executable instructions that, if executed by a computing device cause the computing device to perform the method as described in claim 10, wherein:
  said final level-of-detail value of a given pixel is clamped to a first value when said final level-of-detail value is below said first value; and
  said final level-of-detail value of a given pixel is clamped to a second value when said final level-of-detail value is above said second value.

14. The one or more computing device readable medium having stored thereon, computing device executable instructions that, if executed by a computing device cause the computing device to perform the method as described in claim 13, wherein said first value is a minimum of a predetermined range and said second value is a maximum of said predetermined range.

15. The one or more computing device readable medium having stored thereon, computing device executable instructions that, if executed by a computing device cause the computing device to perform the method as described in claim 14, wherein said predetermined range is between zero and logarithm base two of a maximum dimension of said given pixel projected into an image space.

16. The one or more computing device readable medium having stored thereon, computing device executable instructions that, if executed by a computing device cause the computing device to perform the method as described in claim 9, wherein said level-of detail interpolant value is calculated as a function of an X coordinate value, a Y coordinate value, and an inverse of a square of a view distance (W) value of said vertex.

17. The one or more computing device readable medium having stored thereon, computing device executable instructions that, if executed by a computing device cause the computing device to perform the method as described in claim 16, wherein said final level-of-detail value is interpolated as a function of said level-of-detail interpolant value and said view distance (W) value of said vertex.

18. A graphics processor comprising:
  a setup module for receiving a draw command and parameters describing a geometric primitive and for calculating a level-of-detail interpolant value for a vertex of said geometric primitive; and
  a raster module communicatively coupled to said setup module for receiving said level-of-detail interpolant value for said vertex and for calculating a final level-of-detail value for a pixel of said geometric primitive as a function of said level-of-detail interpolant value for said vertex, wherein said final level-of-detail value comprises an integer portion and a fractional portion;
  a data fetch module communicatively coupled to said raster module for receiving said final level-of-detail value and for fetching texture data stored in a mip-map as a function of said final level-of-detail value; and
  a micro-shader module communicatively coupled to said raster module for receiving said final level-of-detail value and for determining a color of said corresponding pixel as a function of said fractional portion of said final level-of-detail value.

19. The graphics processor as described in claim 18, wherein said data fetch module fetches said texture data stored in said mip-map as a function of said integer portion.

* * * * *